Aug. 9, 1960   W. C. BRADSHAW, JR., ET AL   2,948,519
MOBILE EARTH SURFACING APPARATUS
Filed July 21, 1958   5 Sheets-Sheet 2

WILBERT C. BRADSHAW, JR.
DOLPH W. RUSCHHAUPT
INVENTORS
HUEBNER & WORREL
ATTORNEYS
BY

WILBERT C. BRADSHAW, JR.
DOLPH W. RUSCHHAUPT
INVENTORS

HUEBNER & WORREL
ATTORNEYS

Aug. 9, 1960  W. C. BRADSHAW, JR., ET AL  2,948,519
MOBILE EARTH SURFACING APPARATUS
Filed July 21, 1958  5 Sheets-Sheet 4
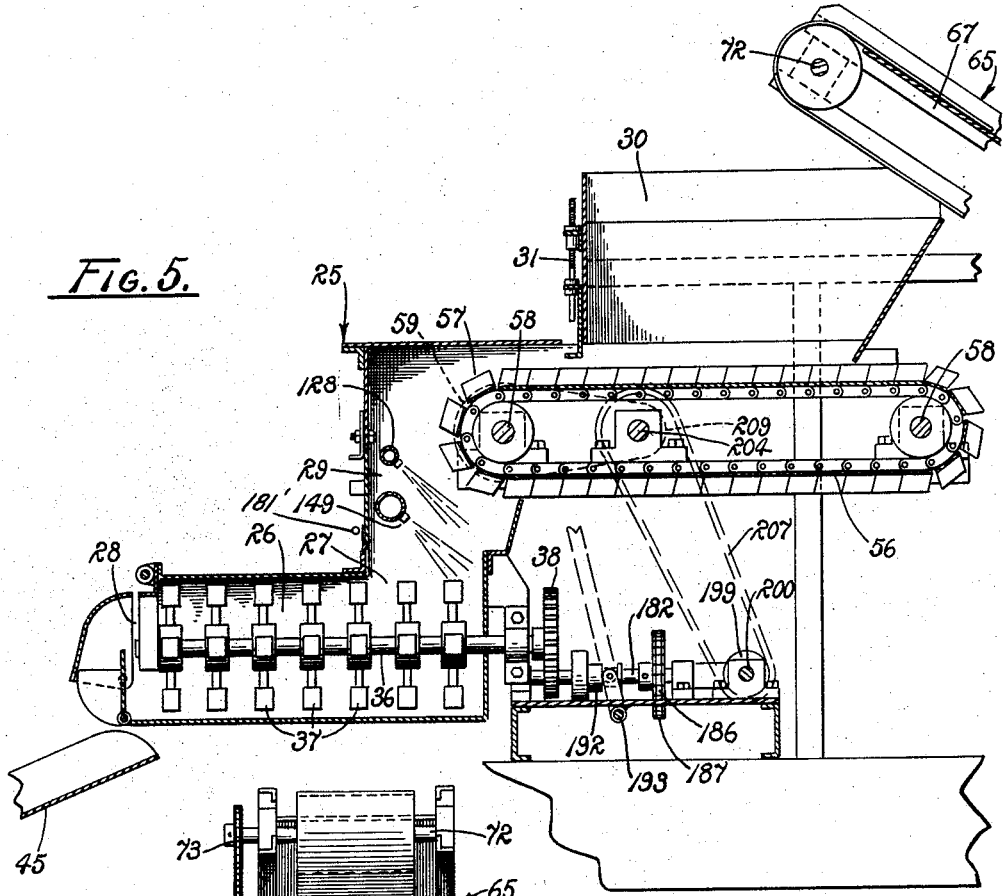
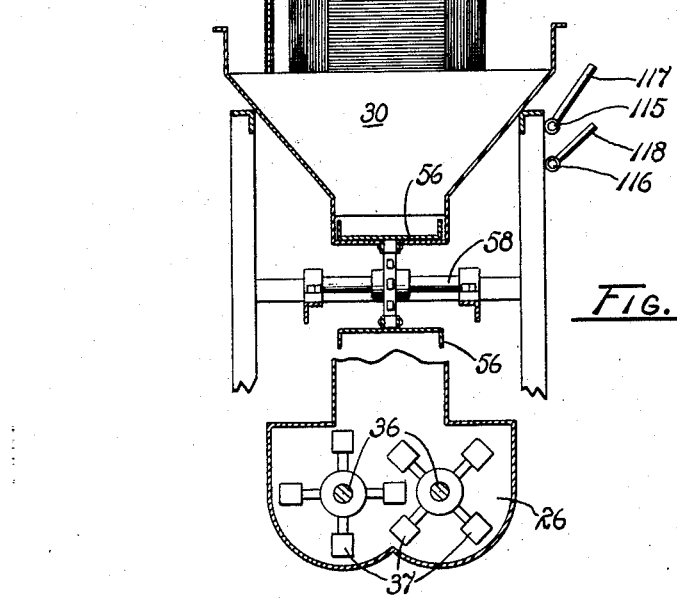
WILBERT C. BRADSHAW, JR.
DOLPH W. RUSCHHAUPT
INVENTORS
HUEBNER & WORREL
ATTORNEYS
BY
Richard M. Worrel Aug. 9, 1960   W. C. BRADSHAW, JR., ET AL   2,948,519
MOBILE EARTH SURFACING APPARATUS
Filed July 21, 1958   5 Sheets-Sheet 5

WILBERT C. BRADSHAW, JR.
DOLPH W. RUSCHHAUPT
INVENTORS

HUEBNER & WORREL
ATTORNEYS
BY

United States Patent Office 2,948,519
Patented Aug. 9, 1960

2,948,519

MOBILE EARTH SURFACING APPARATUS

Wilbert C. Bradshaw, Jr., and Dolph W. Ruschhaupt, Fresno, Calif., assignors to California Fresno Investment Corp., Fresno, Calif., a corporation of California Filed July 21, 1958, Ser. No. 749,785

4 Claims. (Cl. 259—154)

The present invention relates to a mobile earth surfacing apparatus for continuously mixing ingredients for surface paving material and applying the resultant material to a surface traversed by the apparatus and more particularly, to such an apparatus in which the proportions of the ingredients used can be easily, accurately, and quickly changed, and in which delivery of the ingredients to be mixed are synchronized whereby the total quantity of mix can be increased or decreased without changing the proportions of the ingredients.

Asphalts and other bituminous materials are commonly used for road construction, paving, and other earth surfacing applications. These materials may be applied as a hot mix in which heated flowable asphalt is spread onto the surface to be paved; in which event the asphalt is then rolled and allowed to harden by cooling. In order to apply asphaltic combinations without heat, they may be liquified by emulsification. With emulsified asphalts, it is found that unless the resulting product is used soon after the emulsion is mixed with the aggregates, the aggregates employed settle from the emulsion and an un-uniform product results which cannot effectively be employed.

Because of the ability to liquify bituminous materials and the desirability of immediate application, the present invention contemplates the provision of a mobile plant for continuously mixing the bituminous material with an aggregate, such as gravel, and for applying such mixture to a road over which the plant is traveled. In addition to saving time, the mix applied is more homogeneous than when hauled from a distant plant to the surface to be paved.

However such mobility has involved certain difficulties. Depending on the type of road or surface to be paved, the ingredients of the paving mixture frequently must be modified. State laws, climatic conditions, job specifications, and the like, call for predetermined amounts of certain bituminous materials to be mixed with given amounts of water and various types of aggregates. Although formulas may establish the proportions for any particular road or surface in advance of actual construction, nevertheless, modification may have to be made in the field as construction proceeds.

Accordingly, it is an object of the present invention to provide improvements in a mobile earth surfacing apparatus or traveling plant for application of emulsified asphalt and aggregate mixes.

Another object is to enable mobile depositing of surfacing mixtures having controlled characteristics onto a surface to be paved.

Another object is to provide a traveling road surfacing machine which is adapted for individual adjustment of the proportions of ingredients employed in earth paving mixtures manufactured in the machine during earth traversing movement.

Another object is to enable the total amount of earth surfacing mixture to be changed without disturbing previously established proportions in a machine of the nature described.

Another object is to provide an earth surfacing apparatus in which the delivery of the ingredients of the earth surfacing material to be mixed is synchronized so that the total quantity of mix can be changed without changing the proportions of the individual ingredients.

Other objects are to provide an apparatus of this nature which is durable in construction, dependable in operation, and adapted to handle various materials for preparing and applying a paving mixture.

These, together with other objects, will become more fully apparent upon reference to the following description and accompanying drawings.

In the drawings:

Fig. 5 is a somewhat enlarged, fragmentary, longitudinal section taken through a portion of the surfacing machine.

Fig. 6 is a somewhat enlarged fragmentary transverse section taken through a portion of the surfacing machine.

Fig. 9 is a somewhat enlarged side elevation of one of the valves employed in the present apparatus.

Figure 1:
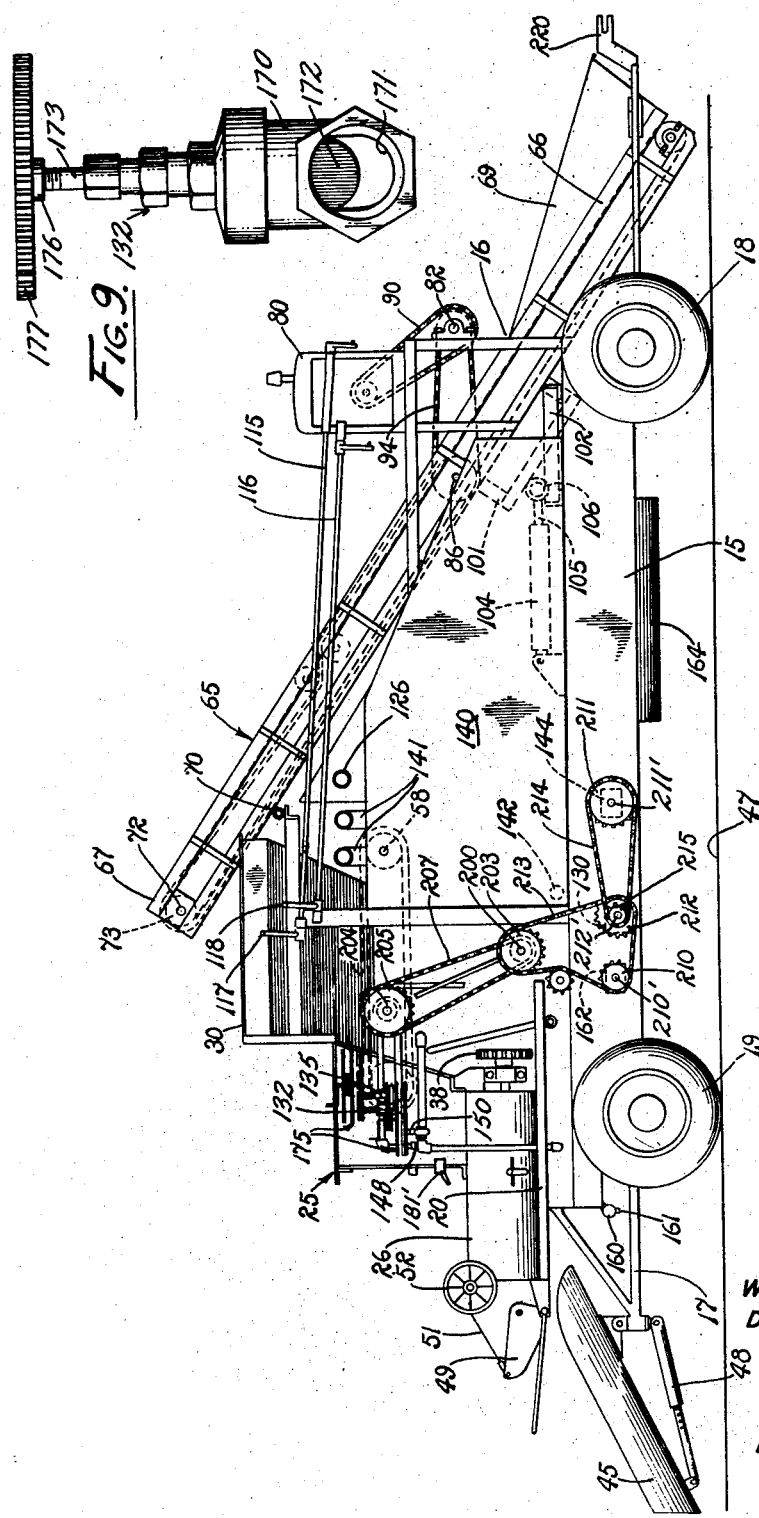
Fig. 1 is a side elevation of the surfacing machine of the subject invention.

Referring more particularly to the drawings, the surfacing machine of the subject invention includes an elongated support frame 15 having a forward end portion 16 and a rearward end portion 17. Front wheels 18 and rear wheels 19 support the frame for earth traversing movement along a path longitudinally of the frame. A substantially horizontal operator's platform 20 is provided in the support frame adjacent to the rearward end portion and over the rear wheels at one side of the frame.

With particular reference to Figs. 1 and 5, a housing 25 is mounted on the support frame 15 and includes an elongated substantially horizontal lower mixing chamber 26 extended longitudinally of the frame, an upwardly disposed inlet 27, and a rearwardly disposed outlet 28. The housing includes an intermediate, generally upright spray chamber 29 communicating with the inlet of the mixing chamber, and an upwardly extended funnel portion 30 elevationally adjustable by means of a screw 31.

Figure 7:
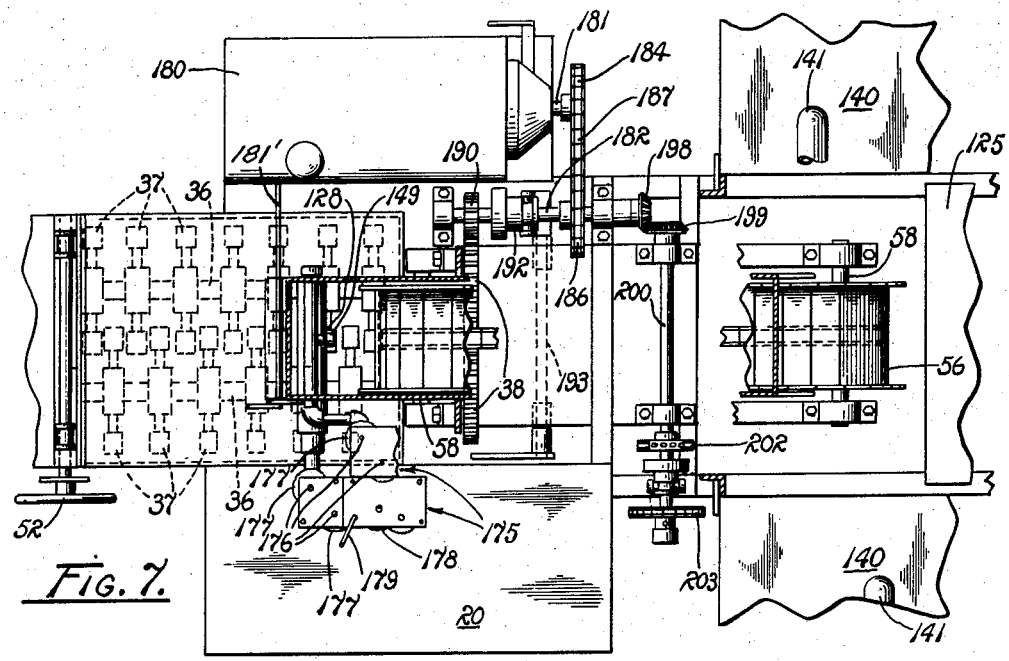
Fig. 7 is a somewhat enlarged fragmentary plan view of a portion of the surfacing machine with parts thereof in cross section and dashed to show internal structure.

Elongated substantially horizontal shafts 36 are journaled for rotation on the support frame 15 and longitudinally extended within the mixing chamber 26 in spaced substantially parallel relationship, as best seen in Figs. 5, 6 and 7. Paddles 37 are rigidly mounted on the shafts and extend radially outwardly therefrom with the paddles on one shaft staggered with respect to the paddles on the other shaft. The paddles are adapted for rotary movement in the mixing chamber and this latter structure constitutes a pug mill. Driven gears 38 are secured to the forwardly extended ends of the shafts externally of the housing 25 and are in mesh with each other for opposite rotational movement of the shafts.

An elongated rearwardly downwardly declined discharge chute 45 is mounted on the rearward end portion 17 of the frame 15 for swiveling movement about a substantially vertical axis and elevational adjustment about a horizontal axis. The chute has a receiving end subjacent to the outlet 28 of the mixing chamber 26 and a discharging end in adjacent spaced relation to a road 47, or the like, to be surfaced. An elongated telescopically adjustable tie rod 48 pivotally interconnects the frame and the chute for enabling elevational adjustment thereof. A gate 49 is mounted for pivotal movement on the housing 25 between a position closing the outlet 28 of the mixing chamber 26, as seen in Fig. 5, and a position opening such outlet, as seen in Fig. 1. A reel 50 is mounted on the housing, and an elongated cable 51 interconnects the reel and the gate. The reel provides a hand wheel 52 for winding and unwinding the cable whereby the gate may be manually opened and closed.

An elongated aggregate delivery conveyer 56 is mounted in the frame 15 in a substantially horizontal position beneath the funnel portion 30 of the housing 25 and has a discharge end 57 extended into the upper end of the spray chamber 29. The delivery conveyer includes longitudinally spaced shafts 58 extended transversely of the frame in substantially horizontal positions, and a driven sprocket 59 is rigidly secured to the rearwardmost shaft 58.

An elongated aggregate supply conveyer 65 is mounted in the support frame 15 in a rearwardly upwardly inclined position and has a receiving end 66 extended forwardly of the forward end portion 16 of the frame and a discharge end 67 extended above the funnel portion 30 of the housing 25. A hopper 69 is mounted on the receiving end of the supply conveyer and is adapted to be filled with aggregate to be carried upwardly by the supply conveyer. The supply conveyer is also mounted for elevational pivotal movement by means of a hinge 70. The supply conveyer includes an upper driven shaft 72 on which is rigidly secured a driven sprocket 73.

Figure 2:
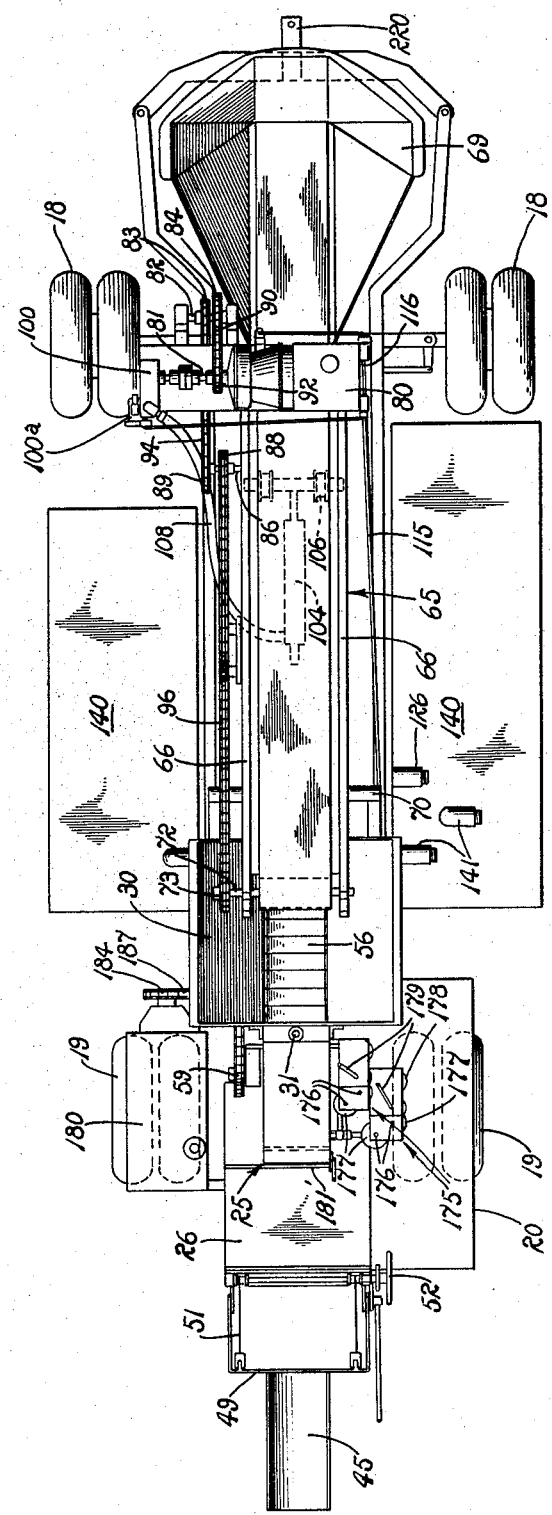
Fig. 2 is a top plan view of the surfacing machine.
Figure 3:
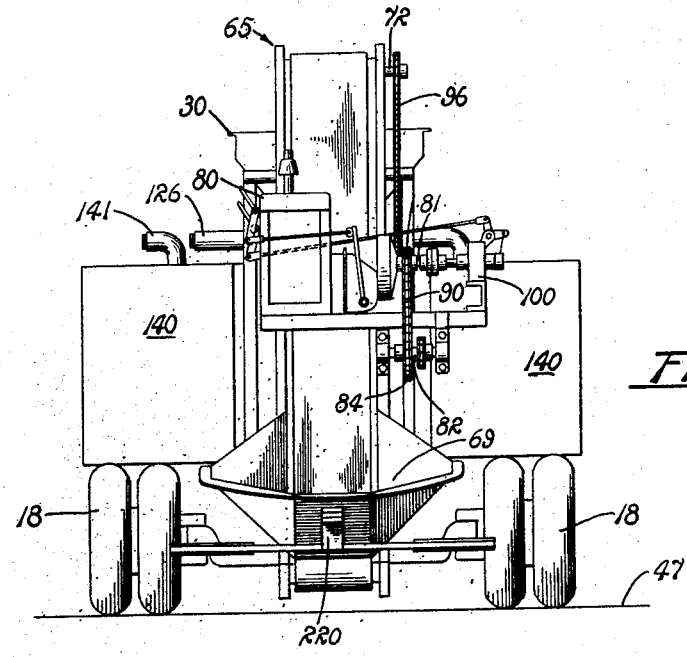
Fig. 3 is a front end elevation of the surfacing machine.
Figure 4:
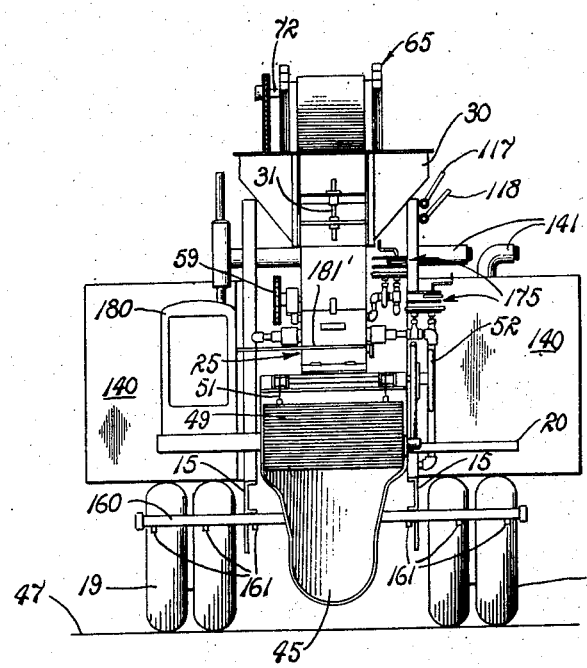
Fig. 4 is a rear end elevation of the surfacing machine.

An auxiliary gasoline engine 80 is mounted on the support frame 15 at its forward end portion 16 and includes an output shaft 81, as best seen in Figs. 1 and 2. A first countershaft 82 is mounted in the frame in transverse horizontal position, and a drive sprocket 83 is rigidly secured on this countershaft. A driven sprocket 84 is also secured on the countershaft 82. A second countershaft 86 is mounted rearwardly of the first countershaft in transverse horizontal position, and drive and driven sprockets 88 and 89 are secured to the second countershaft. A drive chain 90 is extended around the drive sprocket 92 on the engine shaft 81 and the driven sprocket 84. An intermediate chain 94 is extended around the driven sprocket 89 and the drive sprocket 83. A driven chain 96 is extended around the driven sprocket 73 for the aggregate supply conveyer 65 and the drive sprocket 88 whereby upon energization of the engine 80, the aggregate supply conveyer is motivated to lift aggregate from the hopper 69 upwardly along said conveyers.

A conveyer positioning pump 100 is mounted in the frame 15 and is driven by the engine shaft 81. With particular reference to Figs. 1 and 2, a conveyer camway 101 is rigidly mounted on the underside of the supply conveyer 65, and a frame camway 102 is rigidly mounted on the frame in substantially horizontal relation below the conveyer camway. An elongated hydraulic ram 104 is mounted on the frame rearwardly of the frame camway for elevational pivotal movement around a transversely extended axis and includes a forwardly extended piston rod 105. A wedge 106 is rigidly mounted on the piston rod and bears against both the conveyer and frame camways in longitudinally slidable wedging engagement therebetween. The ram is hydraulically connected by means of a conduit 108 to the pump 100 whereby the supply conveyer 65 can be raised and lowered by extending and retracting the ram, as will be apparent.

An aggregate control linkage 115 is connected to the engine 80 for varying the speed of rotation of the output shaft 81 and is extended rearwardly along the support frame to a position above and adjacent to the operator's platform 20. Similarly, a ram control linkage 116 is connected to a valve 100a in hydraulic circuit with the pump 100 and is extended rearwardly of the support frame to a position adjacent to the aggregate control linkage. Handles 117 and 118 are connected to the extended ends of the linkages for enabling convenient manipulation thereof.

Figure 8:
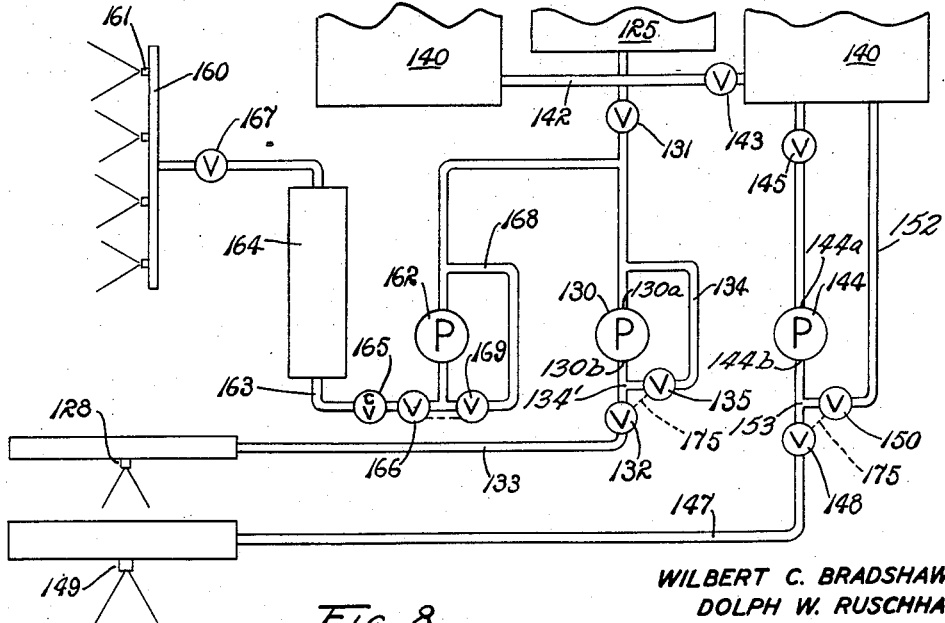
Fig. 8 is a fragmentary schematic diagram of an hydraulic system utilized in the subject invention.

A water tank 125 is mounted on the support frame 15 generally centrally thereof and includes a filler spout 126. A water spray nozzle 128 is mounted in the housing 25, as best seen in Fig. 5, and is extended into the spray chamber 29 at a position slightly below and rearwardly spaced from the discharge end 57 of the aggregate delivery conveyer 56. The spray nozzle is directed so as to spray water in a path generally forwardly and downwardly in the spray chamber. With particular reference to the hydraulic system illustrated in Fig. 8, a water pump 130 is mounted on the frame and has an inlet 130a connected to the water tank through a main valve 131 for opening and closing the hydraulic circuit to the tank. An outlet valve 132 is connected to the outlet 130b of the pump and is connected to the water spray nozzle through an outlet conduit 133. A by-pass conduit 134 interconnects the inlet and outlet of the pump 130 and joins the outlet conduit at a junction 134' at the outlet of said pump; and a by-pass valve 135 is connected in the by-pass conduit. The outlet and by-pass valves have fluid passageways of predetermined cross-sectional area and valve control members movable in these passageways between open and closed positions incrementally to vary the areas and the flow through the passageways. The control members are mechanically interconnected for alternate and opposite opening and closing, as will be seen, so as to proportion the total flow from the pump between the outlet conduit 133 and the by-pass conduit. Thus, for any given speed of operation of the pump, the sum of the flows in the outlet and by-pass conduits is substantially equal to the total flow at the outlet of the pump.

A pair of asphalt emulsion tanks 140 is mounted on the frame 15 on opposite sides of the water tank 125, as best seen in Figs. 2 and 7, and each has a filler spout 141. Also, by reference to the hydraulic system illustrated in Fig. 8, the tanks are interconnected by a conduit 142 in which is located a reserve valve 143. An emulsion pump 144 has an inlet 144a connected to one of the emulsion tanks, and a valve 145 controls flow from the tank to the pump. An outlet conduit 147 connects the outlet 144b of the pump 144 through an outlet valve 148 to an emulsion spray nozzle 149 mounted in the housing 25 and extended into the spray chamber 29 below the water spray nozzle 128. The emulsion spray nozzle is adapted to spray asphalt emulsion generally downwardly and forwardly in the spray chamber on aggregate cascading therein and subsequent to its being sprayed with water. A by-pass valve 150 is connected in a by-pass conduit 152 joining the outlet of the emulsion pump to the emulsion tank; the connection to the tank rather than directly to the pump inlet is to enable greater recirculation and mixing of the emulsion. The by-pass and outlet conduits 152 and 147, respectively, meet at a junction 153 at the outlet of the pump 144. The emulsion outlet and by-pass valve are mechanically connected like valves 132 and 135 for a similar purpose.

An advance water spray manifold 160 provides a plurality of advance spray nozzles 161 and is mounted at the rearward portion 17 of the frame 15 and in a horizontal position extended transversely of the frame. The spray nozzles are arranged to spray water downwardly on a road 47 in advance of movement of the chute 45 thereover. Again, with reference to Fig. 8, water is supplied to the advance spray nozzles by means of an hydraulic circuit including a pump 162, an outlet conduit 163 connecting the outlet of the pump 162 to the spray manifold, a water pressure accumulator 164 in the outlet conduit, a check valve 165 in the conduit, an outlet valve 166, and a branch valve 167. The inlet of the pump 162 is connected to the water tank 125 through the main water valve 131. A by-pass conduit 168 connects the inlet and the outlet of the advance spray pump, and a by-pass valve 169 is connected in this conduit. The valves 166 and 169 are mechanically interconnected like valves 132 and 135. Preferably each of the pumps is of the positive displacement type wherein flow through a pump is proportional to the speed at which it is driven.

Calibrated valve control or adjustment units 175 are mounted in the frame 15 and having controlling connection to the outlet and the by-pass valves 132, 135, 148, and 150. Such control units and valves with which they are associated are specifically described in the copending patent application entitled Fluid Flow Regulation, Serial No. 714,112, filed February 10, 1958. Typical of the specific construction of each of the valves 132, 135, 148, 150, 166, and 169 is valve 132 illustrated in Fig. 9. The valve 132 includes a body 170 providing a fluid passageway 171 of predetermined cross-sectional area in communication with the conduit 133, and a valve control member 172 transversely slidably movable in the body between open and closed positions in the passageway whereby fluid conducted through the passageway, and thus the conduit 133, can be varied between zero, when the member is in fully closed position, and a maximum, when the member is in fully open position. A valve stem 173 is screw-threadably connected to the valve member and is rotatably journaled in the body. Rotation of the stem in opposite directions moves the valve member between open and closed positions. Preferably, each of the units 175 includes shafts 176 individually connected to the stems of the valves associated therewith with gears 177 rigidly mounted on the shafts and in mesh with each other. Because of the geared interconnection, and arrangement of the valves, when the outlet valve 132, for example, is being opened incident to rotation of the shafts 176, the by-pass valve 135 is being closed, and vice versa. The control units also include a train of gears 178 in mesh with one of the gears on the shafts and calibrated for enabling setting of the valves into predetermined positions. A control handle 179 is connected to one of the gears in said train for effecting rotation of the shafts 176 upon rotation of the gear to which the handle is connected. Accordingly, a predetermined flow can be established in each of the spray nozzles 128 and 149 by rotating the control handles 179 to predetermined positions determinable by the calibrations on the train of gears 178. The oppositely acting outlet and by-pass valves allow control of the fluid in the outlet conduits while permitting their respective pumps to operate at high efficiency by always having substantially full flow through the pumps. Further, by adjusting the speed of the engine shaft 81, the rate of aggregate discharge from the upper discharge end 67 of the supply conveyer 65 onto the delivery conveyer 56 can be controlled. In this manner the proportions of the aggregate, the water, and the asphalt emulsion delivered to the mixing chamber 26 can be individually varied so that any desired mix can be obtained.

The pumps 130, 144 and 162; the aggregate delivery conveyer shaft 58; and the pug mill shafts 36 are synchronously driven by a main gasoline engine 180 mounted on the support frame 15 adjacent to its rearward end portion 17 and on the opposite side thereof from the operator's platform 20, as best seen in Fig. 7. Preferably, the engine 180 has a throttle 181' extended transversely over the mixing chamber 26 so as to be accessible from the platform. The engine has a longitudinally forwardly extended output shaft 181. Of course, the speed of rotation of the output shaft is varied by adjusting the throttle. A lower longitudinal countershaft 182 is mounted for rotation on the support frame, as best seen in Figs. 5 and 7. A drive sprocket 184 on the shaft 181, a driven sprocket 186 on the countershaft 182, and a chain 187 around these sprockets are employed for transferring drive from the engine shaft to the longitudinal countershaft. A drive gear 190 is rigidly secured to the longitudinal countershaft and is in mesh with one of the pug mill driven gears 38 for imparting rotation to the pug mill shafts 36. A clutch 192 including a clutch control linkage 193 is employed for engaging and disengaging the drive gear 90 with respect to the driven gear 38.

A drive bevel gear 198 is rigidly secured to the longitudinal countershaft 192 and drives the bevel gear 199 secured to a lower transversely extended countershaft 200. A conveyer drive sprocket 202, and a multiple drive sprocket 203 are rigidly mounted on an end of the lower transversely extended countershaft. A transversely extended upper countershaft 204, best seen in Fig. 1, provides a driven sprocket 205 connected to the conveyer drive sprocket by means of a chain 207. A suitable sprocket and chain arrangement, generally indicated by the numeral 209 in Fig. 5, interconnects the upper countershaft 204 with the driven sprocket 59 of the aggregate delivery conveyer 56.

With reference to Fig. 1, an advance spray pump driven sprocket 210, an emulsion pump driven sprocket 211, and a water pump driven sprocket 212 are all mounted on the support frame 15 on respective driven shafts 210', 211' and 212', respectively, journaled in the frame, individually connected to the pumps 162, 144 and 130, respectively, and extended in substantially horizontal positions transversely of the frame. A main drive chain 213 encircles the multiple drive sprocket 203 and the sprockets 210 and 212, and an auxiliary chain 214 encircles the sprocket 211 and a drive sprocket 215 on the shaft for the water pump. It will be evident that the drive for the pumps 130, 144 and 162; the delivery conveyer 56; and the pug mill shafts 36 are synchronized by the common power source or driving mechanism, namely, the engine 180. By speeding up rotation of the shaft 181 of engine, the speeds of the pumps are increased to deliver a greater quantity of flow, and the conveyer 56 travels faster to discharge more aggregate per unit of time into the chamber 26, that is, to increase the rate of "flow" of aggregate. By decreasing the speed of the shaft 181, the flow of water, emulsion and aggregate to the chamber is likewise decreased. Hence, the throttle 181' controls the speeds of the pumps. However, once the proportions of the ingredients to the chamber are established by adjustment of the calibrated control units 175 and the speed of the engine 80, increases or decreases of the speed of the engine 180 do not appreciably affect these predetermined proportions although the total flow is increased or decreased; this obviously increases or decreases the total quantity of mix for application to the road surface 47.

*Operation*

The operation of the described embodiment of the subject invention is believed to be readily apparent and is briefly summarized at this point. Initially, of course, the tanks 125 and 140 are respectively filled with water and asphalt emulsion through their filler spouts 136 and 141. The aggregate supply conveyer 65 and the discharge chute 45 are both elevationally adjusted, as desired. The hand wheel 52 is rotated to lower the gate 49. The frame 15 is connected to a drawing vehicle, such as a truck, not shown, by means of a hitch 220. In practice, the truck constituting the drawing vehicle is loaded with gravel and this gravel is periodically dumped or shoveled into the hopper 69.

Job specifications usually set forth the proportions of water, aggregate and asphalt emulsion in the mix to be applied to the road 47, or other surface. The control units 175 are adjusted to yield the desired proportions of emulsion and water depending on the type of mix that is required. Further, the valves 166 and 169 are adjusted to control the amount of water to the spray nozzles 161. The valves 131, 145 and 167 are opened and the apparatus is placed in operation by starting the engines 80 and 180. This motivates the conveyers 56 and 65, rotates the pug mill shafts 36, and drives the pumps 130, 144 and 162. The desired proportions of water and asphalt emulsion are controlled by the units 175. The speed of the auxiliary engine 80 is adjusted to control the speed of the supply conveyer and thus to control the amount of aggregate supplied to the aggregate delivery conveyer 56 per unit of time. The speed of the engine 180 is then adjusted to vary the speed of the conveyer 56 and of the pumps 130 and 144 to yield the total quantity of mix desired per unit of time.

Before the apparatus is drawn forwardly some mix should be prepared and be ready to slide down the chute 45. Thus, as best seen in Fig. 5, to explain how the mix is formed, aggregate drops from the supply conveyer 65 onto the delivery conveyer 56 where it is carried into the spray chamber 29. The aggregate cascades downwardly in the spray chamber through the inlet 27 into the mixing chamber 26. In so doing, it is first sprayed with water and then with asphalt emulsion. The water, emulsion and aggregate are thoroughly mixed by the rotating paddles 37 in the pug mill, and the resultant mix is generally moved toward and out of the outlet 28 onto the discharge chute 45. The mix slides down onto the road 47 which has been moistened by water from nozzles 161. The mix on the road is thereafter allowed to harden.

If an operator on the platform 20 decides for some reason that the total amount of mix being distributed from the chute 45 should be increased, for example, the speed of the engines 80 and 180 are increased. Thus more aggregate per unit of time is supplied to the mixing chamber 26 by the conveyer 56, and since the speeds of the pumps 130 and 144 are increased, more water and asphalt emulsion is delivered to the mixing chamber. However, the proportion of water to asphalt emulsion to aggregate remains as previously established by the calibrated control units 175 and the speed of the engine 80. Additionally, if these proportions need to be changed, the control handles 179 are rotated and the speed of the engine 80 is changed. It will be evident, however, that these proportions can be changed without changing the total quantity of flow. In other words, the proportions can be changed without varying the speed of the engine 180 or changing the sprocket and chain drive from the engine 180 to the pumps 130 or 144.

Thus, it will be evident that the subject invention involves a continuous operation whereby paving material is manufactured as the apparatus traverses the earth to be surfaced and is applied to the surface to be paved immediately after being mixed or prepared. An operator situated on the platform 20 can observe the mix as it descends the chute 45, change the proportions of the ingredients introduced into the mix, and also change the total amount of mix being mixed and discharged so that more or less can be deposited onto the surface traversed. In practice it has been found that utilization of the subject machine enables surfaces to be paved in a minimum of time, at less cost, and with superior results than heretofore considered possible.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A mobile earth surfacing machine comprising a support frame; ground engaging members mounting the frame for earth traversing movement; a housing mounted on the frame providing a mixing chamber having an outlet; means mounted on the frame for supplying aggregate to the chamber; means mounted on the frame for supplying asphalt emulsion to the chamber; means mounted on the frame for supplying water to the chamber, the aggregate, emulsion and water being adapted to be mixed in the chamber to produce an earth surfacing material; a common driving mechanism mounted on the frame having driving connection to the aggregate supplying means, the emulsion supplying means, and the water supplying means for synchronously delivering aggregate, emulsion and water to the mixing chamber in predetermined amounts; and means mounted in the frame for receiving said mix from the outlet of the mixing chamber and for discharging it onto a surface traversed by the support frame, each of the water and emulsion supplying means including a supply tank, a variable speed pump having an inlet connected to the tank and an outlet adapted to pump fluid therefrom at a rate substantially proportional to the speed of the pump, an outlet conduit extended into the housing for conducting fluid into the chamber and being connected to the pump outlet, an adjustable outlet valve in the outlet conduit, a by-pass conduit in fluid communication with the inlet and outlet of the pump, an adjustable by-pass valve in the by-pass conduit, and adjustable means interconnecting the outlet and by-pass valves for alternately and oppositely opening and closing the valves whereby the total flow through the pump is adjustably selectively divided between the outlet and by-pass conduits and the sum of the flows in the outlet and by-pass conduits substantially equals the total flow through the pump for any given speed of the pump, said common driving mechanism being adjustable and being connected to the emulsion and water pumps for synchronously varying the speeds of the pumps and thereby synchronously varying the rates of the flow of water and emulsion to the chamber.

2. In a machine providing a pair of reservoirs adapted to contain two different fluids to be mixed, and a mixing chamber; an apparatus for mixing said fluids wherein the total quantity of mix prepared in a given time and wherein the proportions of the fluids in the mix are independently adjustable, comprising pumps having outlets, inlets individually connected to the reservoirs, and driven shafts, the fluids pumps from the outlets of the pumps being substantially proportional to the speeds of rotation of their respective driven shafts; common variable speed drive means coupled to both driven shafts of the pumps for adjustably increasing and decreasing the speeds of rotation of the driven shafts concurrently thereby to increase and decrease, respectively, the flow of fluids from the pump outlets; outlet conduits individually interconnecting the mixing chamber and the pump outlets; by-pass conduits individually providing fluid communication between the pump outlets and their respective inlets, the by-pass and outlet conduits meeting in junctions at the outlets of their respective pumps; outlet and by-pass valves individually connected in the outlet and by-pass conduits between their respective junctions and the mixing chamber and pump inlets, each valve providing a fluid passageway of predetermined cross-sectional area and a valve control member movable in the passageway between open and closed positions so as to change the effective cross-sectional area of the passageway whereby the fluid passing through the valve can be incrementally varied between zero and a maximum; and adjustable means interconnecting the valve control members of the outlet and by-pass valves associated with each pump for moving the control members alternately and oppositely between open and closed positions and so that the sum of the flows through the passageways of the valves associated with each pump is always substantially the same and equal to the total flow from such pump, whereby the proportions of the fluids delivered to the chamber for any given speed of said variable speed drive means can be adjusted, and whereby the total quantity of the mix in the chamber can be adjusted by varying the speed of said drive means.

3. In a machine for mixing two fluid ingredient wherein the total quantity of mix prepared in a given time and wherein the proportions of the ingredients in the mix are independently adjustable; a housing providing a mixing chamber; reservoirs for individually containing the fluid ingredients each having an outlet; spray nozzles directed into the chamber for individually delivering the ingredients thereto; pumps having outlets, inlets individually connected to the reservoir outlets, and driven shafts, the fluid pumped from the outlets of the pumps being substantially proportional to the speed of rotation of their respective driven shafts; an engine having a rotatable drive shaft and including means for varying the speed of rotation of the drive shaft; coupling means individually interconnecting the drive shaft and the driven shafts for imparting rotation to the driven shafts by the drive shaft whereby increasing and decreasing the drive shaft speed respectively increases and decreases the quantity of fluid pumped from the outlets of the pumps; outlet conduits individually interconnecting the nozzles and the pump outlets; by-pass conduits individually providing fluid communication between the pump outlets and inlets, the by-pass and outlet conduits meeting in junctions at the outlets of their respective pumps; outlet and by-pass valves individually connected in the outlet and by-pass conduits between their respective junctions and their respective nozzles and pump inlets, each valve providing a fluid passageway of predetermined cross-sectional area and a valve control member movable in the passageway between open and closed positions so as to change the cross-sectional area of the passageway whereby the fluid passing through the valve can be incrementally varied between zero and a maximum; and adjustable means interconnecting the valve control members of the outlet and by-pass valves associated with each pump for moving the control members alternately and oppositely in 180° phase displacement between open and closed positions and so that the sum of the flows through the passageways of the valves associated with each pump is always substantially the same and equal to the total flow from such pump, whereby the proportions of the ingredients delivered to the chamber for any given speed of the engine can be adjusted without changing the total quantity of mix, and whereby the total quantity of the mix in the chamber can be adjusted by varying the speed of the drive shaft and without changing the proportions of said ingredients.

4. The machine of claim 3 wherein said machine is adapted to produce an earth surfacing material, wherein said ingredients are respectively water and a binding material, and including an aggregate delivery conveyor adapted to receive aggregate thereon and providing a discharge end extended into the mixing chamber and including a driven shaft for motivating the conveyor, and coupling means interconnecting the engine drive shaft and the driven shaft of the delivery conveyer to increase and decrease the amount of aggregate delivered to the chamber incident to increase and decrease in the speed of rotation of the drive shaft whereby the proportions of water, binding material and aggregate remain the same for any speed of the drive shaft.

References Cited in the file of this patent

UNITED STATES PATENTS

| | | |
|---|---|---|
| 737,273 | Reynolds | Aug. 25, 1903 |
| 1,941,808 | McConnaughay | Jan. 2, 1934 |
| 1,969,533 | Pipes et al. | Aug. 7, 1934 |
| 1,997,037 | Barber | Apr. 9, 1935 |
| 2,103,299 | Ravmsbeck | Dec. 28, 1937 |
| 2,327,942 | Thoresen | Aug. 24, 1943 |
| 2,350,715 | Berg et al. | June 6, 1944 |
| 2,611,707 | Rourke et al. | Sept. 23, 1952 |